(12) United States Patent
Bachl et al.

(10) Patent No.: US 8,280,396 B2
(45) Date of Patent: Oct. 2, 2012

(54) OVERLOAD CONTROL METHOD FOR A WIRELESS CELLULAR NETWORK

(75) Inventors: Rainer W. Bachl, Nuremberg (DE); Fang-Chen Cheng, Randolf, NJ (US); Jung Ah Lee, Pittstown, NJ (US)

(73) Assignee: Alcatel Lucent, Paris (FR)

( * ) Notice: Subject to any disclaimer, the term of this patent is extended or adjusted under 35 U.S.C. 154(b) by 1017 days.

(21) Appl. No.: 12/007,516

(22) Filed: Jan. 11, 2008

(65) Prior Publication Data

US 2009/0179755 A1 Jul. 16, 2009

(51) Int. Cl.
*H04W 72/00* (2009.01)
(52) U.S. Cl. ........................ 455/453; 455/63.1
(58) Field of Classification Search .................. 455/453, 455/63.1
See application file for complete search history.

(56) References Cited

U.S. PATENT DOCUMENTS

| | | | |
|---|---|---|---|
| 7,016,686 B2 * | 3/2006 | Spaling et al. | 455/453 |
| 7,162,250 B2 * | 1/2007 | Misra | 455/453 |
| 2003/0003921 A1 * | 1/2003 | Laakso | 455/453 |
| 2006/0172739 A1 * | 8/2006 | Wigard et al. | 455/442 |
| 2006/0209721 A1 * | 9/2006 | Mese et al. | 370/254 |
| 2007/0105561 A1 * | 5/2007 | Doetsch et al. | 455/450 |

FOREIGN PATENT DOCUMENTS

| | | |
|---|---|---|
| WO | WO 2006/007318 | 1/2006 |
| WO | WO 2006/099547 | 9/2006 |
| WO | WO 2007/138651 | 12/2007 |

OTHER PUBLICATIONS

International Search Report and Written Opinion dated May 28, 2009.
Japanese Office Action dated Apr. 2, 2012 issued in Japanese Application No. 2010-542260.

* cited by examiner

*Primary Examiner* — Kamran Afshar
*Assistant Examiner* — Sayed T Zewari
(74) *Attorney, Agent, or Firm* — Harness, Dickey & Pierce

(57) ABSTRACT

A method may include determining a metric for at least one physical resource block of a wireless cellular network in at least a one cell. Each physical resource block may include a set of frequencies, and/or the metric may be based on interference on the at least one physical resource block in the at least one cell. A determination of whether the metric violates a metric threshold may be made, and an overload indicator may be sent to at least one other cell if the metric violates the metric threshold.

20 Claims, 3 Drawing Sheets

OVERLOAD CONTROL METHOD FOR A WIRELESS CELLULAR NETWORK

BACKGROUND

1. Field

The invention is related to an overload control method.

2. Description of Related Art

Conventional overload control schemes are used for inter-cell power control. A conventional overload control scheme may complement an Inter-cell Interference Coordination (ICIC) scheme. The conventional overload control scheme detects an interference overload event at each cell and sends an overload indicator to neighboring cells.

SUMMARY

According to an example embodiment, a method may include determining a metric for at least one physical resource block of a wireless cellular network in at least a one cell. Each physical resource block may include a set of frequencies, and/or the metric may be based on interference on the at least one physical resource block in the at least one cell. A determination of whether the metric violates a metric threshold may be made, and an overload indicator may be sent to at least one other cell if the metric violates the metric threshold.

According to another example embodiment, a method may include receiving an overload indicator from at least one cell in at least one other cell, the overload indicator indicating that a metric based on interference on at least one physical resource block of a wireless cellular network in the at least one cell violates a metric threshold. Each physical resource block may include a set of frequencies.

According to still another example embodiment, a wireless cellular network may include at least one cell. The at least one cell may be configured to determine a metric for at least one physical resource block in the at least one cell. Each physical resource block may include a set of frequencies. The metric may be based on interference on the at least one physical resource block in the at least one cell. The at least one cell may be configured to determine if the metric is greater than a metric threshold and/or send an overload indicator to at least one other cell if the metric is greater than the metric threshold.

According to an example embodiment, a wireless cellular network may include at least one cell and at least one other cell. The at least on other cell may be configured to receive an overload indicator from the at least one cell. The overload indicator may indicate that a metric based on interference on at least one physical resource block in the at least one cell violates a metric threshold. Each physical resource block may include a set of frequencies.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the scope and wherein.

DETAILED DESCRIPTION OF EXAMPLE EMBODIMENTS

Figure 1:
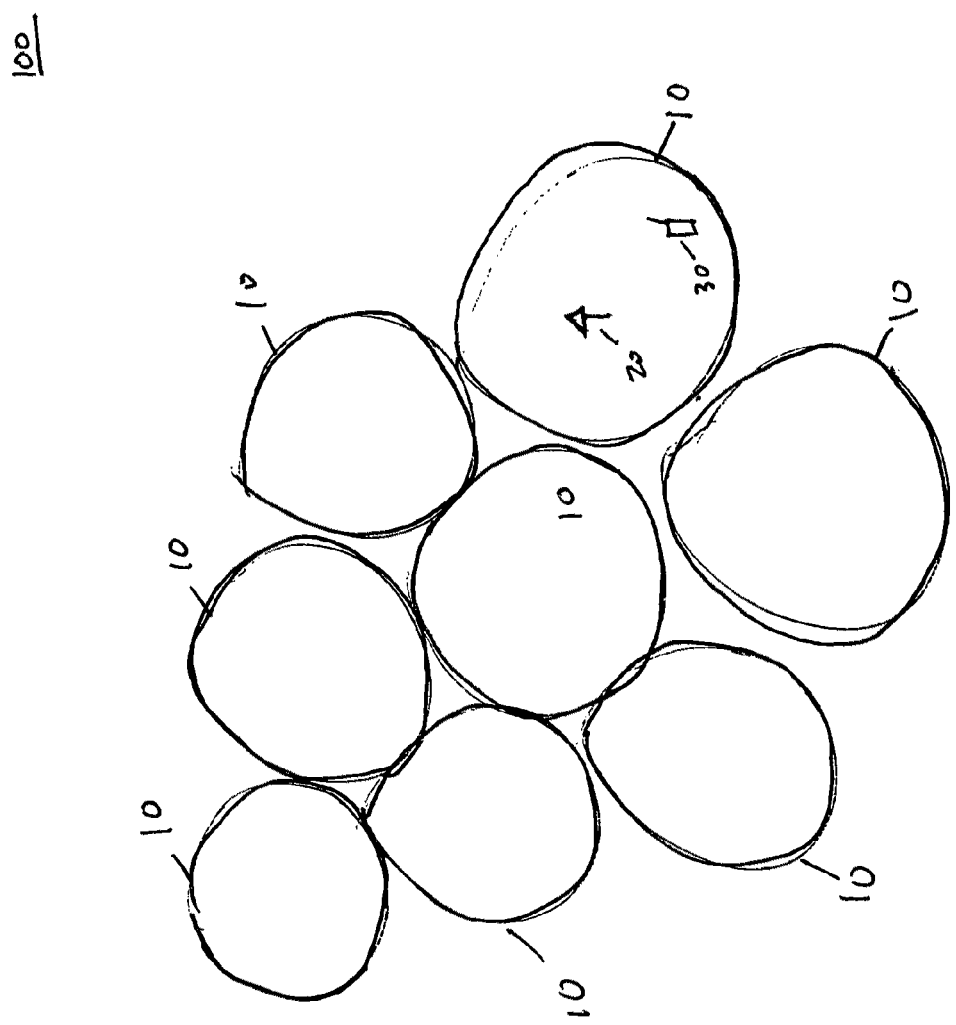
FIG. 1 illustrates a wireless cellular network according to an example embodiment.

In the following description, for purposes of explanation and not limitation, specific details are set forth such as particular architectures, interfaces, techniques, etc., in order to provide a thorough understanding of example embodiments. However, it will be apparent to those skilled in the art that example embodiments may be practiced in other illustrative embodiments that depart from these specific details. In some instances, detailed descriptions of well-known devices, circuits, and methods are omitted so as not to obscure the description of example embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware at existing radio network control nodes.

In the following description, illustrative embodiments will be described with reference to acts and symbolic representations of operations (e.g., in the form of signal flow diagrams) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising,"

when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "mobile" may be considered synonymous to, and may hereafter be occasionally referred to, as a mobile unit, mobile station, mobile user, access terminal (AT), user equipment (UE), subscriber, user, remote station, access terminal, receiver, etc., and may describe a remote user of wireless resources in a wireless communication network. The term "base station" may be considered synonymous to and/or referred to as a base transceiver station (BTS), base station, NodeB, etc. and may describe equipment that provides data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

Reference will now be made to example embodiments, which are illustrated in the accompanying drawings, wherein like reference numerals refer to the like components throughout.

Wireless Communication Network

FIG. 1 illustrates a wireless cellular network 100. The wireless cellular network 100 may include a plurality of cells 10. Each of the cells 10 may include a base transceiver station 20 and/or one or more user equipment 30. On skilled in the art will readily recognize that cells, base transceiver stations, and user equipment described below in relation to example embodiments may be any of the cells 10, base transceiver stations 20, and user equipment 30 illustrated in FIG. 1

Overload control methods may complement Inter-Cell Interference Coordination (ICIC) schemes. In a semi-static ICIC scheme, multiple frequency zones may be configured depending on an interference target for each zone. A frequency zone may be a group of selected frequencies, e.g., a group of channels. A semi-static ICIC scheme may create low interference zones having lower interference than other zones, for example, by constraining power spectral density (PSD) of interference on the low interference zones.

Semi-Static ICIC Scheme

Figure 2:
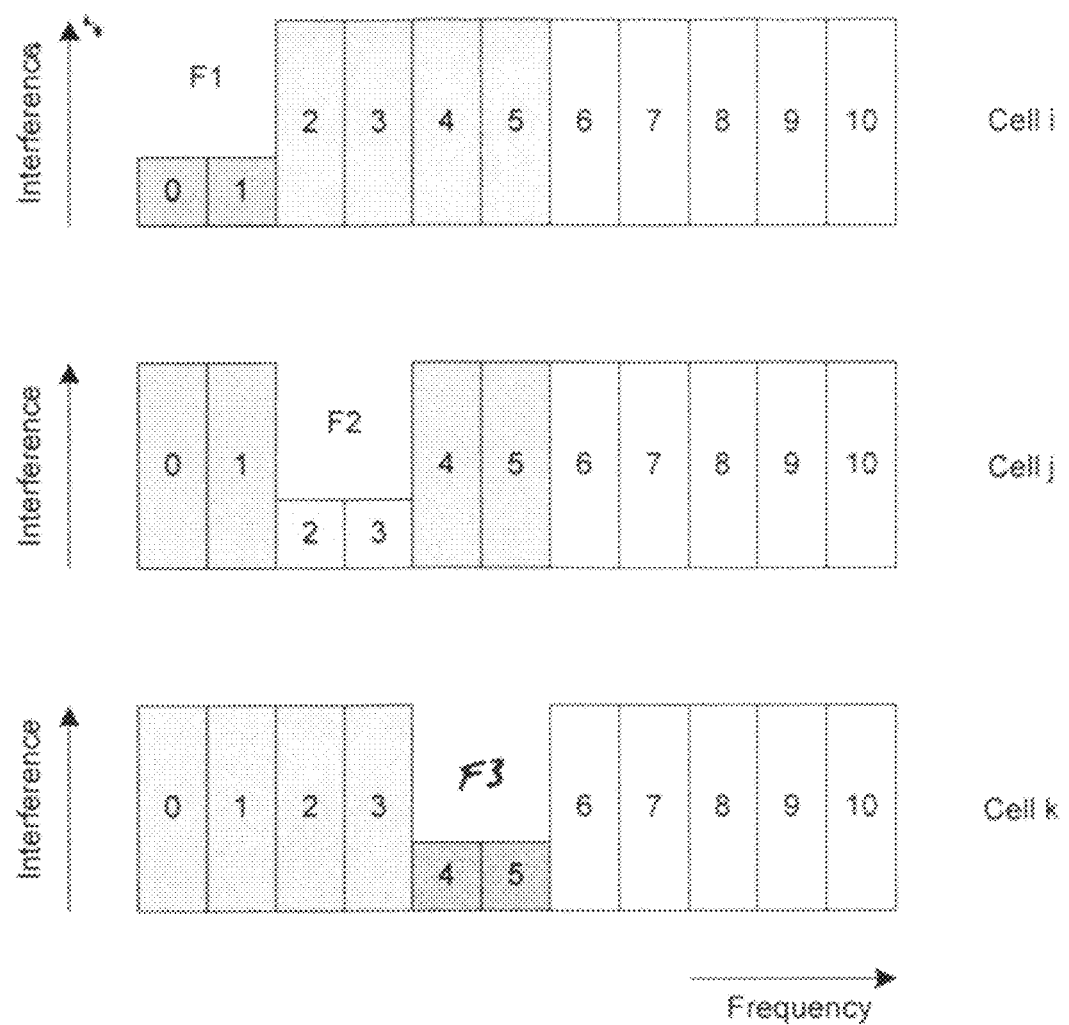
FIG. 2 illustrates an example semi-static Inter-Cell Interference Coordination (ICIC) scheme according to an example embodiment.

FIG. 2 illustrates a semi-static ICIC scheme including low interference zones F1, F2, and F3 for cells i, j, and k, respectively. Each of the low interference zones may have a target interference PSD level. User equipment at an edge of neighboring cells may have constraints on an upper limit of PSD for the low interference zone F1. The low interference zone F1 may allow the user equipment at an edge of cell i to be scheduled with relatively higher PSD because the edge of cell i has a relatively lower inference level and/or the edge of cell i is not a low interference zone for any neighboring cells.

The semi-static ICIC scheme may create favorable sub-bands of frequencies, which have a lower interference level and allow edge users to transmit with higher PSD. Conventionally, a semi-static ICIC scheme relies on downlink path loss and path loss difference to the user equipment between a serving cell, e.g., the source cell of the user, and a neighbor cell.

An overload control method according to an example embodiment may detect an interference overload event at each cell relative to the target interference level of the cell and send an overload indicator OI, e.g., via the well-known X2 interface, to neighboring cells. The overload indicator may be a one bit indicator for each physical resource block (PRB) or each group of PRBs. A PRB is a set of sub-carriers, i.e., frequencies, which may be allocated to a user at the same time. A PRB may be a set of consecutive frequencies. A group of PRBs may be a group of consecutive PRBs or a group of nonconsecutive, e.g., isolated, PRBs. Accordingly, the overload indicator OI may ensure that edge user coverage is fulfilled in the presence of interference and/or reduce any failures in the semi-static ICIC scheme because of measurement errors (e.g., estimation error in downlink path loss or path loss difference), mismatch between uplink and downlink path loss, or an overshoot of an interference level above a target interference level.

Overload Control

Figure 3:
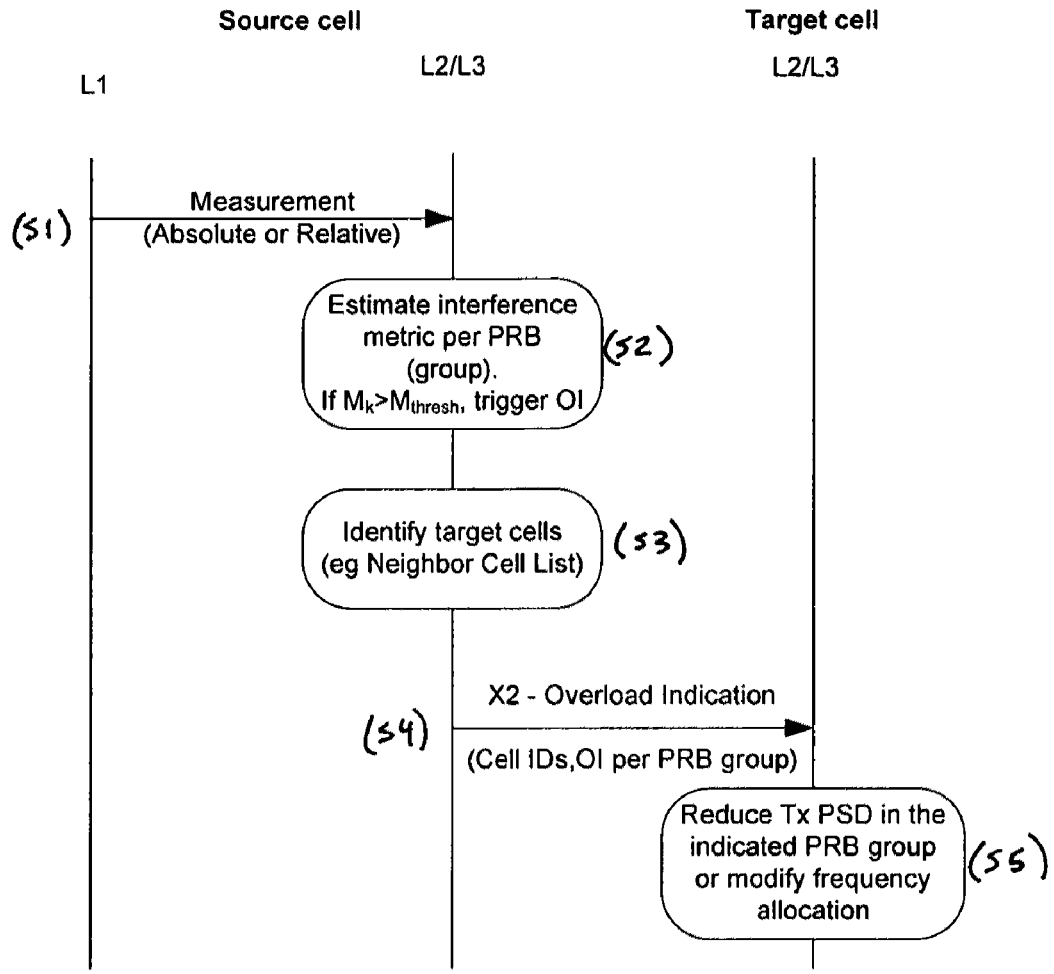
FIG. 3 is a signal flow and process diagram illustrating an overload control method according to an example embodiment.

FIG. 3 is a signal flow and process diagram illustrating an overload control method according to an example embodiment. As shown in FIG. 3, a source cell may measure a metric $M_k$ for uplink interference for each physical resource block PRB or for each group of PRBs (S1). For example, a metric $M_k$ may be measured at a lower layer L1, e.g., a physical layer, of the wireless cellular network 100. A determination of the metric $M_k$ will discussed in detail below. The source cell may estimate the metric $M_k$ for each PRB or each group of PRBs and determine if the metric $M_k$ violates a metric threshold $M_{thresh}$ (S2). For example, a determination of whether the metric $M_k$ violates the metric threshold $M_{thresh}$ may be made at higher layers L2/L3, e.g., a resource management layer, of the wireless cellular network 100. For example, if the metric $M_k$ exceeds the metric threshold $M_{thresh}$ an overload indication event may occur. The source cell may identify one or more target cells (S3) and send the overload indicator OI, e.g., via an X2 interface, to the one or more target cells (S4). The target cell or cells may be determined by a neighbor cell list, e.g., a neighbor cell list of the source cell.

Each of the target cell(s) may identify user equipment having a strongest interference on the source cell that sent the overload indicator OI. For example, each cell may identify a different user equipment. For example, path loss reported from interfering user equipment to a serving cell (e.g., the source cell of the user), and the strongest neighbor cell may be used by the target cell to determine an interference caused by the interfering user equipment on the source cell. For example, path loss reporting in medium access control (MAC) protocol data units (PDUs) as part of scheduling information may be used for the determination. Alternatively, power headroom reporting and a path loss difference between the serving cell and the strongest neighbor cell may be used for the determination. Downlink reference signal transmit power of the serving cell and the strongest neighbor cell may be used for the determination.

The target cell(s), e.g., a target cell scheduler of the target cell(s), may reduce, e.g., by a desired, or alternatively, a predetermined step size, a target transmit PSD of the identified user equipment having the strongest interference for the corresponding overloaded PRB or PRB group (S5). Alternatively, the target cell(s) may modify a frequency allocation of the identified user equipment (S5). Target transmit PSD may be equivalent to a desired, or alternatively, a predetermined normalized PSD threshold. Target transmit PSD may be configured for each PRB for each cell. For example, a target cell power control function may reduce a power control parameter for the identified user equipment having the strongest interference by a desired, or alternatively, a predetermined step size. However, example embodiments are not limited thereto and the target cell(s) may reduce the power control parameter by one step or the overload indicator may include more than one bit to indicate a step size.

However, the target cell may instead or additionally change a frequency allocation of the identified user equipment; for example, if changing the target transmit PSD of the identified user equipment is not sufficient to reduce the interference level of the source cell. For example, the target cell may change a frequency zone of the identified user equipment to a different frequency zone.

The target cell(s) need not send a response to the source cell to inform the source cell about any action taken in response to the overload indicator OI. However, example embodiments are not limited thereto and the target cell may send a response to the source cell in response actions taken based on the overload indicator OI.

Determining Metric $M_k$

The metric $M_k$ may be based on an interference level on the source cell. For example, the metric $M_k$ may represent interference PSD, i.e., an interference per PRB. Interference PSD may be computed as a total interference power over a group of PRBs divided by the number of PRBs in the group. Interference PSD may provide a measure with a smaller dynamic range over a wider range of PRB sizes.

Absolute interference and Interference over Thermal (IoT) may be used as metrics for interference level. However, for absolute interference, if power control is active, power control may compensate for the increased interference level, thereby overcoming a rise in interference. IoT may require estimation of thermal noise power experienced on an uplink. Accordingly, IoT may create gaps for thermal noise measurement if based on an algorithm with relatively reasonable complexity. However, creating measurement gaps may be relatively difficult in asynchronous network deployment.

The metric $M_k$ for an overload control method according to an example embodiment may be based on a relative metric defined by a ratio of interference PSD relative to a maximum allowed user equipment transmit power in the source cell. The metric $M_k$ may be normalized because cell coverage may depend on two factors: allowed maximum transmit power and the interference PSD. The allowed maximum user equipment transmit power may depend on cell implementation and/or may be a function of maximum user equipment transmit power depending on user equipment power class, coverage planning, and/or a semi-static ICIC scheme.

The metric $M_k$ for interference may be defined in accordance with the following equation:

$$M_k = \text{Normalized\_Interference\_PSD} = \frac{\sum_k \text{Interference}(PRB_k)/N}{P_{\text{Max}}} \quad (1)$$

where the numerator of equation (1) is an average interference per PRB over the PRBs in the group of PRBs, N being the number of PRBs in the group. The group of PRBs may be a low interference zone configured by a semi-static ICIC scheme for a source cell. $P_{max}$ is the allowed maximum user equipment transmit power. However, example embodiments are not limited thereto, and alternative normalization factors, e.g., allowed maximum transmit PSD, which is related to the power control parameter, may be used.

The overload indication event may be triggered, e.g., the source cell may send the overload indicator OI, if the metric $M_k$ is greater than the metric threshold $M_{thresh}$. The metric threshold $M_{thresh}$ may be a parameter separately configurable for each cell. For example, if the normalized interference PSD is greater than a normalized interference PSD threshold, the overload indication event may be triggered. The parameters for the overload indication event, for example, the metric $M_k$, the metric threshold $M_{thresh}$, the step size configuration, and/or the frequency zones, may be operation and maintenance (OAM) parameters.

Accordingly, example embodiments may provide an overload control method including sending an overload indicator if a metric for interference for a PRB or a group of PRBs is greater than a threshold for the metric.

Example embodiments being thus described, it will be obvious that the same may be varied in many ways. Such variations are not to be regarded as a departure from the example embodiments, and all such modifications are intended to be included within the scope.

We claim:

1. A method comprising:
   determining a metric for at least one physical resource block of a wireless cellular network in at least one cell, each physical resource block including a set of frequencies, the metric based on interference on the at least one physical resource block in the at least one cell;
   determining if the metric violates a metric threshold; and
   sending an overload indicator to at least one other cell if the metric violates the metric threshold, such that the at least one other cell identifies a user producing a strongest interface on the at least one physical resource block in the at least one cell in response to the overload indicator;
   wherein
   the metric is a ratio of power spectral density of interference on the at least one physical resource block in the at least one cell relative to a maximum allowed transmit power of one or more users in the at least one cell.

2. The method of claim 1, wherein the metric is calculated in accordance with the following equation:

$$M_k = \text{Normalized\_Interference\_PSD} = \frac{\sum_k \text{Interference}(PRB_k)/N}{P_{\text{Max}}}$$

wherein the numerator is an average interference for each physical resource block of the at least one physical resource block, N is a number of the at least one physical resource block, and $P_{max}$ is the maximum allowed user transmit power of the one or more users in the at least one cell.

3. The method of claim 1, wherein the maximum allowed transmit power is in the form of a maximum allowed transmit power spectral density of one or more users in the at least one cell.

4. The method of claim 1, wherein the sending the overload indicator to the at least one other cell includes selecting the at least one other cell from a neighbor cell list of the at least one cell.

5. The method of claim 1, wherein the at least one physical resource block corresponds to a low interference frequency zone of the at least one cell, the low interference frequency zone including a set of frequencies having a target power spectral density in the at least one cell which constrains the power spectral density of interference from neighboring cells.

6. The method of claim 1, wherein the overload indicator is one bit.

7. The method of claim 1, wherein the sending the overload indicator includes sending the overload indicator via an interface between the at least one cell and the at least one other cell.

8. A method comprising:
receiving, in at least one other cell, an overload indicator from at least one cell, the overload indicator indicating that a metric based on interference on at least one physical resource block of a wireless cellular network in the at least one cell violates a metric threshold, each physical resource block including a set of frequencies; and
identifying, at the at least one other cell, a user producing a strongest interference on the at least one physical resource block in the at least one cell in response to the overload indicator; wherein
the metric is a ratio of power spectral density of interference on the at least one physical resource block in the at least one cell relative to a maximum allowed transmit power of one or more users in the at least one cell.

9. The method of claim 8, wherein the metric is calculated in accordance with the following equation:

$$M_k = \text{Normalized\_Interference\_PSD} = \frac{\sum_k \text{Interference}(PRB_k)/N}{P_{\text{Max}}}$$

wherein the numerator is an average interference for each physical resource block of the at least one physical resource block, N is a number of the at least one physical resource block, and $P_{max}$ is the maximum allowed user transmit power of the one or more users in the at least one cell.

10. The method of claim 8, wherein the maximum allowed transmit power is in the form of a maximum allowed transmit power spectral density of one or more users in the at least one cell.

11. The method of claim 8, further comprising:
at least one of reducing power spectral density of a target transmit power of the identified user and modifying a frequency allocation of the identified user.

12. The method of claim 11, wherein the reducing the power spectral density of the target transmit power of the identified user reduces the power spectral density of the target transmit power of the identified user by a step size.

13. The method of claim 11, wherein the step size is a step size pre-configured at the at least one other cell.

14. The method of claim 11, wherein the modifying the frequency allocation of the identified user includes assigning a different set of frequencies to the identified user.

15. The method of claim 11, wherein the identifying the user producing the strongest interference is based on path loss reporting from the user to the at least one other cell of the user and to a strongest neighbor cell of the at least one other cell of the user.

16. The method of claim 11, wherein the identifying the user producing the strongest interference is based on power headroom reporting and a path loss difference between the at least one other cell of the user and a strongest neighbor cell of the at least one other cell of the user.

17. The method of claim 8, wherein the overload indicator is one bit.

18. A wireless cellular network comprising:
at least one cell configured to determine a metric for at least one physical resource block in the at least one cell, each physical resource block including a set of frequencies, the metric based on interference on the at least one physical resource block in the at least one cell, wherein
the at least one cell is configured to determine if the metric violates a metric threshold and send an overload indicator to at least one other cell if the metric violates the metric threshold, such that the at least one other cell identifies a user producing a strongest interface on the at least one physical resource block in the at least one cell in response to the overload indicator, and
the metric is a ratio of power spectral density of interference on the at least one physical resource block in the at least one cell relative to a maximum allowed transmit power of one or more users in the at least one cell.

19. The method of claim 1, wherein the sending step comprises:
sending the overload indicator to a plurality of other cells if the metric violates the metric threshold, such that each of the plurality of other cells identifies a different user producing the strongest interference on the at least one physical resource block in response to the overload indicator.

20. The method of claim 1, wherein the overload indicator is sent to the at least one other cell if the metric violates the metric threshold, such that the at least one other cell adjusts a transmit power spectral density for only the identified user producing a strongest interference to the at least one cell.

* * * * *